United States Patent [19]
Deschenes

[11] 3,749,452
[45] July 31, 1973

[54] VARIABLE LOAD VALVE
[75] Inventor: Roger Deschenes, Montfermeil, France
[73] Assignee: Compagnie des Freins et Signaux Westinghouse, Sevran, France
[22] Filed: Apr. 19, 1972
[21] Appl. No.: 245,349

[30] Foreign Application Priority Data
May 10, 1972  France .............................. 7116738

[52] U.S. Cl. .......................... 303/22 R, 137/505.17
[51] Int. Cl. ............................................... B60t 8/22
[58] Field of Search ................ 137/505.17; 177/137; 303/22 A, 22 R, 23, 54

[56] References Cited
UNITED STATES PATENTS
3,503,656  3/1970  Shattock et al. ................... 303/22 R Primary Examiner—Duane A. Reger
Attorney—Ralph W. McIntire, Jr.

[57] ABSTRACT

A load weighing device compressively interposable between a sprung portion and an unsprung portion of a vehicle and subjectable to a compressive force of a degree corresponding to the load condition of the vehicle. The weighing device, which is adapted for interposition in a fluid pressure circuit, includes means for converting the compressive force to a proportionally reduced force and valve means operable by the reduced force for effecting transmission of a fluid pressure control signal of a degree inversely proportional to the degree of the compressive force. The weighing device may be modified to transmit a fluid pressure control signal directly proportional to the compressive force reflecting the load condition.

8 Claims, 4 Drawing Figures

VARIABLE LOAD VALVE

BACKGROUND OF THE INVENTION

Presently known load weighing devices operate to provide a fluid pressure control signal of a fixed direct linear relationship to the load, that is, a control signal that is increased or decreased in degree as the load is increased or decreased, respectively.

Weighing devices of the above-mentioned type are frequently used in connection with brake systems wherein the fluid pressure control signal is delivered from a source of fluid under pressure to control valves or apparatus which, in response to the control signal, effect a brake application commensurate with the degree of the control signal reflecting the load condition of the vehicle. As above noted, the degree of the control signal effected by conventional weighing devices is normally directly proportional to or a substantially linear relationship to the vehicle load. Thus, the greater the vehicle load, the greater is the degree of the control signal delivered to the brake-applying apparatus, and consequently, the stronger is the brake application, or, in other words, the weaker the control signal, the weaker would be the brake application.

Conceivably, this type of arrangement could result in an undesirable serious situation. For example, should a failure occur at the source of fluid under pressure providing the fluid pressure for the control signal, a weak or possibly no control signal at all might be transmitted to the brake-applying apparatus, which would read such weak or lack of signal as an empty or unloaded vehicle and effect a light brake application in response thereto, when in reality the vehicle may be fully loaded.

SUMMARY OF THE INVENTION

The object of the invention is to provide a load weighing device for measuring the load condition of a vehicle and thereby effecting transmittal of a fluid pressure control signal to the vehicle brake-applying apparatus for effecting a brake application according to the load condition of the vehicle, the degree of said control signal, however, being inversely proportional to the degree of vehicle load to thereby provide for maximum braking effort in the event of failure of the fluid pressure source providing the control signal, such failure, in effect, being comparable or equivalent to the weakest control signal.

It is also a further object of the invention to provide a vehicle load weighing device characterized by such versitility of structure as to enable the device to be adapted to various load situations or to be modified so as to provide a fluid pressure control signal of a degree directly proportional to the vehicle load, if desired.

The preferred embodiment of the weighing device embodying the invention is intended for use with brake-applying apparatus operable responsively to various degrees of fluid pressure control signals so as to effect a degree of brake application inversely proportional to the degree of the control signal, and comprises a double-acting piston for operating a self-lapping valve unit both of which are contained in a housing disposed between a sprung portion and an unsprung portion of a vehicle, said weighing device further comprising a stress distributor member which is subjected to total compressive and tractive stresses between the sprung and unprung portions and transmits a fraction of said stresses to act on the double-acting piston. In the preferred embodiment of the invention, adjustable biasing means subject the double-acting piston to a predetermined axially directed force which, in the absence of an oppositely acting compressive stress acting on the stress distributor member, that is, under an empty vehicle load condition, is effective for operating the self-lapping valve unit to transmit a fluid pressure control signal of maximum degree to which the brake-applying apparatus responds for effecting a minimal brake application commensurate with the empty vehicle load condition. If the vehicle is loaded, the stress distributor member is subjected to a compressive stress commensurate with the vehicle load, a fraction of such stress being transmitted to act on the double-acting piston in opposition to the force exerted thereon by the biasing means, thereby producing a differential axial force acting on said double-acting piston of lesser magnitude than the force exerted by the biasing means alone and thereby causing the self-lapping valve unit to transmit a weaker control signal to effect a greater brake application.

Both the biasing means and the stress distributor members, in accordance with the invention, may be of various forms, and the self-lapping valve unit may be arranged relative to the double-acting piston so as to produce a control signal directly proportional to the vehicle load.

DESCRIPTION AND OPERATION

Figure 1:
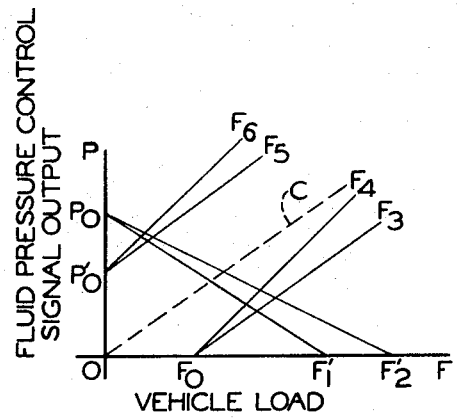
FIG. 1 is a graphical representation of the fluid pressure control signal output of the weighing device as related to the vehicle load.

In the graph shown in FIG. 1, the abscissa or horizontal axis F represents the various compressive and tractive stresses placed on the weighing device by the vehicle load, and the ordinate or vertical axis P represents the fluid pressure control signal output of the weighing device as a function of the stress. A broken line C passing through the origin O of the graph represents a substantially linear relationship between stress F and output P of a conventional vehicle load weighing device.

Figure 2:
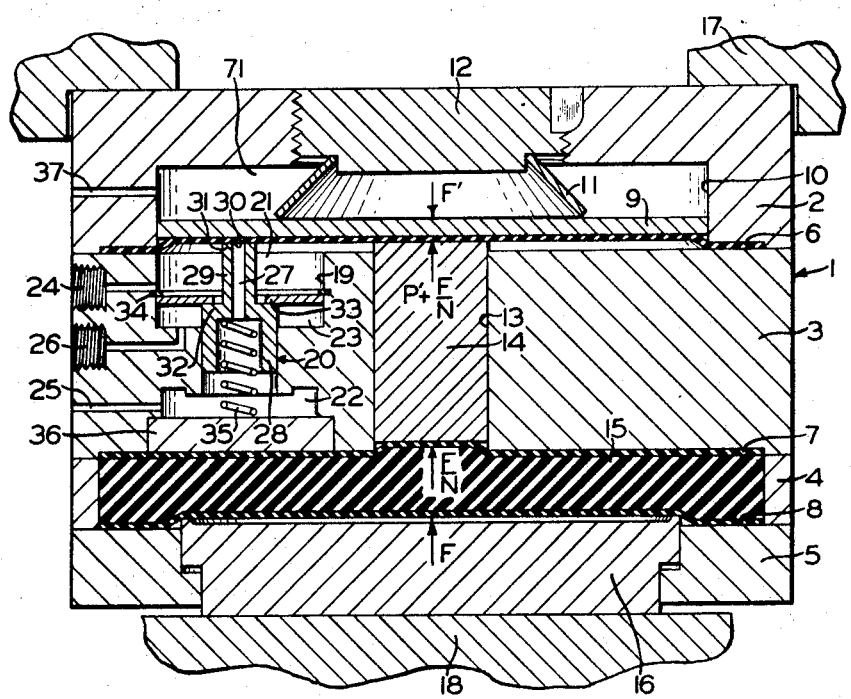
FIG. 2 is an elevational view, in section, of the preferred embodiment of a vehicle load weighing device embodying the invention.

As shown in FIG. 2, one embodiment of a weighing device 1 embodying the invention comprises a multiple-section housing including an upper section 2, an intermediate section 3, a lower section 4, and a retaining ring section 5, all of which are coaxially secured in assembled order by securing bolts (not shown). Flexible diaphragms 6, 7, and 8 are peripherally and sealingly secured between sections 2 and 3, 3 and 4, and 4 and 5, respectively, and are capable of transmitting axial stresses between several members of the weighing device to be presently described.

A disc type reaction piston 9 is operably disposed in a coaxial bore 10 formed in upper casing section 2 so as to be axially movable. Reaction piston 9 is biased downwardly, as viewed in FIG. 2, against the upper face of diaphragm 6 by a biasing element such as a Bellville spring 11 compressed between said reaction piston and an adjustable screw cap 12 concentrically and screw-threadedly disposed in the upper casing section 2, said screw cap serving to selectively adjust the degree of the downwardly directed axial force or stress acting on said reaction piston and indicated in the drawing by an arrow F'. The screw cap 12 is provided with a circular portion extending part way into the upper opening of Bellville spring 11 for keeping said spring centered on the reaction piston 9.

Intermediate housing section 3 is provided with a coaxial bore 13 extending therethrough and of considerably smaller diameter than bore 10 in upper section 2. Bore 13 accomodates an action piston 14 of such axial length as to have the upper end thereof abutting against the lower face of diaphragm 6 and the lower end thereof abutting against the upper face of diaphragm 7. Action piston 14 may thus be subjected at its upper end to downwardly directed force F' and at its lower end to an upwardly directed force or stress imposed thereon by a stress distributor member 15, said upwardly directed force being indicated in the drawing by an arrow F.

Distributor member 15 is closely confined in lower housing section 4 by being in substantially total contact with the adjacent faces of diaphragms 7 and 8 and with the internal peripheral surface of said lower housing section. A disc-like stress transfer member 16 is secured, with limited axial displacement and with its upper face in contact with the lower face of diaphragm 8, by retaining ring section 5.

When mounted in its operative position on the vehicle, the weighing device 1 is disposed between such portions of the vehicle so as to be subjected to spring deflection of the vehicle's suspension apparatus. Thus, the weighing device 1 may be mounted with the upper housing section 2 in contact with a portion 17 of the vehicle body or the sprung portion of the vehicle, while transfer member 16 may rest on a portion 18 resting on the vehicle suspension springs (not shown) which are mounted on the unsprung portion of the vehicle, said transfer member being of sufficient axial dimension as to project beyond the lower limits of retaining section 5 and thereby permit freedom of axial movement of said transfer member.

In order to function properly, the stress distributor member 15 must possess fluid or viscous properties, and, therefore, may be made of such material as rubber or even a hydraulic fluid in a sealed flexible container. Thus when the overall lower surface of the distributor member 15 is subjected to the force of spring action of the vehicel applied thereto through the stress transfer member 16, only a fraction of such force is transmitted to the action piston 14 since the surface portion of the distributor member 15 effectively acting on the lower surface of said action piston is a relatively small fraction of the surface contacting the transfer member. Thus, if F is the overall force applied by the transfer member 16 to the lower surface of distributor member 15, the amount of upwardly applied force at the lower end of action piston 14 may be expressed as $F/n$, as shown by the arrow $F/n$ in the drawing, where n is the ratio of the larger area on the lower face of said distributor member to the smaller area adjacent the lower end of said action piston.

Intermediate housing section is i also provided with an off-center stepped bore 19 axially parallel to bore 13 and in which a double clack or self-lapping valve device 20 is operatively disposed.

Bore 19 cooperates with various components of the valve device 20 to define a delivery chamber 21 adjacent diaphragm 6, an exhaust chamber 22 adjacent diaphragm 7, and a supply chamber 23 therebetween, said chambers being connected to a fluid pressure operable device (not shown), to atmosphere, and to a source of fluid under pressure (not shown) via delivery, exhaust, and passageways 24, 25, and 26, respectively, formed in intermediate housing section 3.

Valve device 20 includes a supply-exhaust valve member having a coaxial passageway 27 extending therethrough and comprising a larger portion 28 sealingly and axially slidable in the smallest diameter portion of stepped bore 19 between supply chamber 23 and exhaust chamber 22. A smaller portion 29 extends axially from the larger portion 28 toward diaphragm 6 which acts as an exhaust valve seat 30 against which an exhaust valve 31 comprising the annular end of said smaller portion may seat when in a closed position. The shoulder formed by the junction of the smaller and enlarged portions of 29 and 28 of the supply-exhaust valve member serves as a supply valve 32 which cooperates with a washer type valve seat 33 secured transversely in stepped bore 19 by a snap ring 34, said valve seat having a concentric opening through which said smaller portion of said supply-exhaust valve member may move axially. Passageway 27 which, as above noted, extends through the entire axial length of the supply-exhaust valve member, has one end constantly open to exhaust chamber 22 and atmosphere via passageway 25 and the other end open to delivery chamber 21 when exhaust valve 31 is in an open or unseated position relative to valve seat 30. A spring 35 compressed between the supply-exhaust valve member and a base plate 36 defining the bottom of exhaust chamber 22 maintains a biasing action of said supply-exhaust valve member for urging the supply valve 32 and the exhaust valve 31 toward their respective seated positions, above defined. A passageway 37 formed in upper housing section 2 provides an atmospheric connection or vent for bore 10 to prevent any dashpot action by reaction piston 9.

In considering the operation of the weighing device 1 shown in FIG. 2 and above described, let it be assumed that plug 12 has been adjusted to place Bellville spring 11 under a predetermined compressive stress F' compatible with the type of vehicle on which the weighing device is mounted and with the minimum and maximum loads thereof, said stress F' acting on reaction piston 9 in the direction indicated by the arrow. Let it further be assumed that passageway 26 and therefore supply chamber 23 is fully charged with fluid pressure as supplied from the source (not shown), and that the car or vehicle is empty so that force F acting on the lower surface of distributor member 15 and, therefore, force $F/n$ acting on the lower end of action piston 14 are minimum. With force F at a minimum, force F' of Bellville spring 11 is initially effective in forcing reaction piston 9 downwardly out of a normal position, in which it is shown, to cause said piston to carry with it the supply-exhaust valve member of valve device 20, and during such downward movement the exhaust valve seat 30 is held against valve 31 in its closed position. At the same time, supply valve 32 is moved away from the fixed supply valve seat 33 to thereby connect delivery chamber 21 and passageway 24 to fluid pressure prevailing in supply chamber 23, such fluid pressure thus providing a fluid pressure control signal of maximum degree to a fluid pressure responsive device or apparatus (not shown) connected to passageway 24. If the apparatus to which passageway 24 is connected is the type of brake-applying apparatus above described, then the maximum control signal produced by valve device 20 will cause said brake apparatus to effect a minimum brake application commensurate with the empty vehicle.

When supply valve 32 is operated to its unseated position, as above described, the resulting pressure prevailing in delivery chamber 21 is effective for applying an upwardly directed force on the underside of diaphragm 6 adjacent said delivery chamber, said force being designated as P'. The total force, therefore, acting upwardly on reaction piston 9 in opposition to F' is the sum of P' and F/n, or P'+F/n, as indicated by the arrow in the drawing. When P'+F/n equals F', reaction piston 9 is restored to a normal position in which supply-exhaust valve member of valve device 20 assumes a lapped condition.

In the absence of any change in the load condition of the vehicle, if the pressure of fluid at delivery passageway 24 is dissipated either through use or leakage, thereby resulting in a reduction of P', reaction piston 9 and self-lapping valve device 20 operate in well-known conventional manner to restore the pressure of fluid at said delivery passageway to the originally established value.

If the load of the vehicle is increased while fluid pressure prevails at delivery passageway 24, in the manner above described, force F transferred by transfer member 16 to distributor member 15 is accordingly increased. Consequently force F/n acting on the lower end of action piston 14 and force P'+F/n acting on reaction piston 9 are accordingly increased. The increase of force P'+F/n overcomes the opposing force F' of spring 11 and causes reaction piston 9 to be moved upwardly. As a result of the upward movement of reaction piston 9, exhaust valve seat 30 is lifted off exhaust valve 31, but supply valve 32 is retained in its seated position by spring 35 because valve seat 33 is fixed in position and, therefore, the supply-exhaust valve member is prevented from following reaction piston 9 in its upward movement.

With exhaust valve 31 in its unseated position, fluid pressure in delivery chamber 21, and therefore the fluid pressure control signal supplied to the brake-applying apparatus, is consequently reduced to a degree commensurate with the existing load until the opposing force F' and P'+F/n attain a balanced state or equilibrium at which the valve device 20 is restored to a lap condition, said reduction of pressure occurring past unseated exhaust valve 31, passageway 27, exhaust chamber 22, and passageway 25.

The compressive adjustment of Bellville spring 11 is predetermined and made such that under maximum load condition of the vehicle, a minimum fluid pressure control signal is produced by the valve device 20 to cause the brake-applying apparatus to effect a maximum brake application compatible with such conditions.

It should be apparent, that should there be a failure of the source of fluid pressure supplied to the weighing device 1 for the control signal, regardless of the load condition of the vehicle, valve device 20 would not be able to produce and transmit any control signal. This condition would, therefore, result in a brake application comparable to a maximum application. Thus, the functional characteristic of the weighing device 1 provides a safety feature in the event of an emergency situation.

In the graph shown in FIG. 1, the operation of the load weighing device, above described, is represented graphically by the lines $P_0$–$F'_1$ and $P_0$–$F'_2$, it being apparent therefrom that the greater the vehicle load, the lesser the control signal output.

Figure 4:
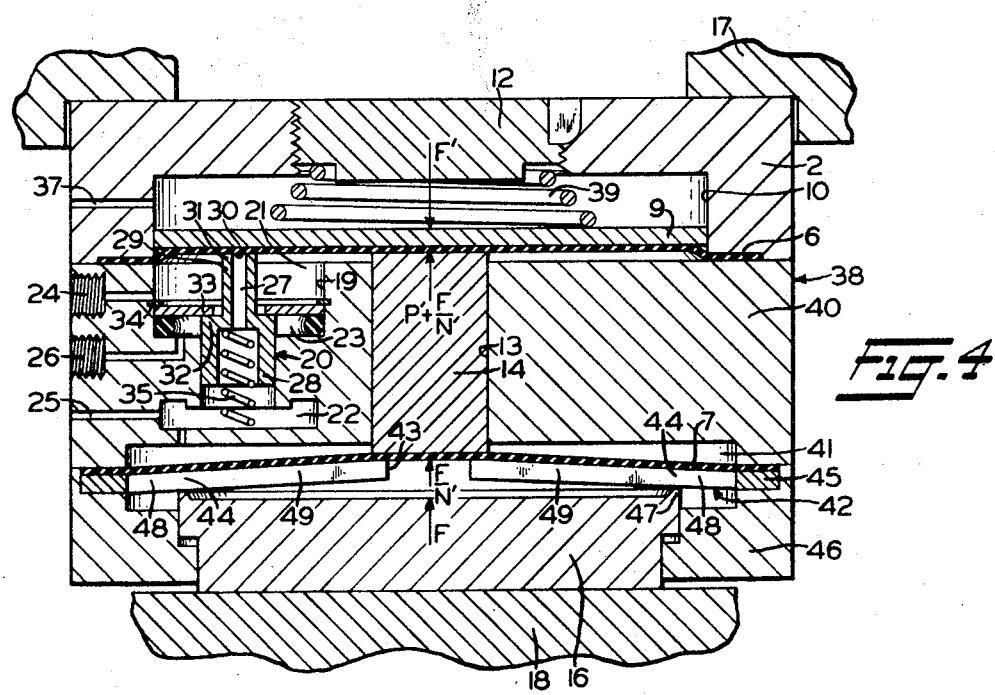

FIG. 4 shows a vehicle load weighing device 38 similar to the load weighing device 1 except as hereinafter set forth. Similar components common to both the devices 1 and 38 have been assigned common reference numerals.

Load weighing device 38 is equipped with a helicoidal spring 39, instead of the Bellville spring 11 as shown in FIG. 2, for applying a predetermined downwardly acting force F' to the reaction piston 9 in a manner similar to said Bellville spring. The device 38 is provided with a central housing section 40 which differs from housing section 3 of the device 1 in that said section 40 has a shallow countersunk recess 41 formed on the lower side thereof to accommodate a distributor plate member 42 which replaces the hydrostatic type distributor member 15 in the device 1.

The function of the distributor plate member 42 is similar to that of the hydrostatic type distributor member 15 of the device 1, that is, to reduce the direct force F applied by the vehicle load to a smaller proportional force to be applied to the lower end of the action piston 14.

The distributor plate member 42 is in the form of a flat disc having a circular opening 43 at the center of a lesser diameter than that of the action piston 14. The plate member 42 is formed by a plurality of equiangularly spaced fingers or levers 44 anchored at one end to an annular peripheral portion 45 clamped between housing section 40 and a retaining ring section 46. The diaphragm member 7 is also clamped between housing section 40 and ring section 46 adjacent the upper side of distributor plate 42. The other ends of levers 44 rest against the lower end of the action piston 14.

The transfer member 16 has an annular lip 47 encircling the outer periphery thereof on the upper side, the diameter of said lip being predetermined so as to have the lip contact each of the levers 44 at a predetermined fulcrum point thus dividing each lever into shorter portions 48 and longer portions 49 each of predetermined length. Thus the portion of load force F acting on transfer member 16 transferred to the lower end of action piston 14 may be expressed as $F/n'$, shown as arrow $F/n'$ in FIG. 4 of the drawings, wherein $n'$ is the ratio of longer portion 49 of lever arm 44 to the shorter portion 48.

Other than the differences in structure, as above noted, between the weighing devices 1 and 38, both devices operate in the manner above described in connection with said device 1.

Figure 3:
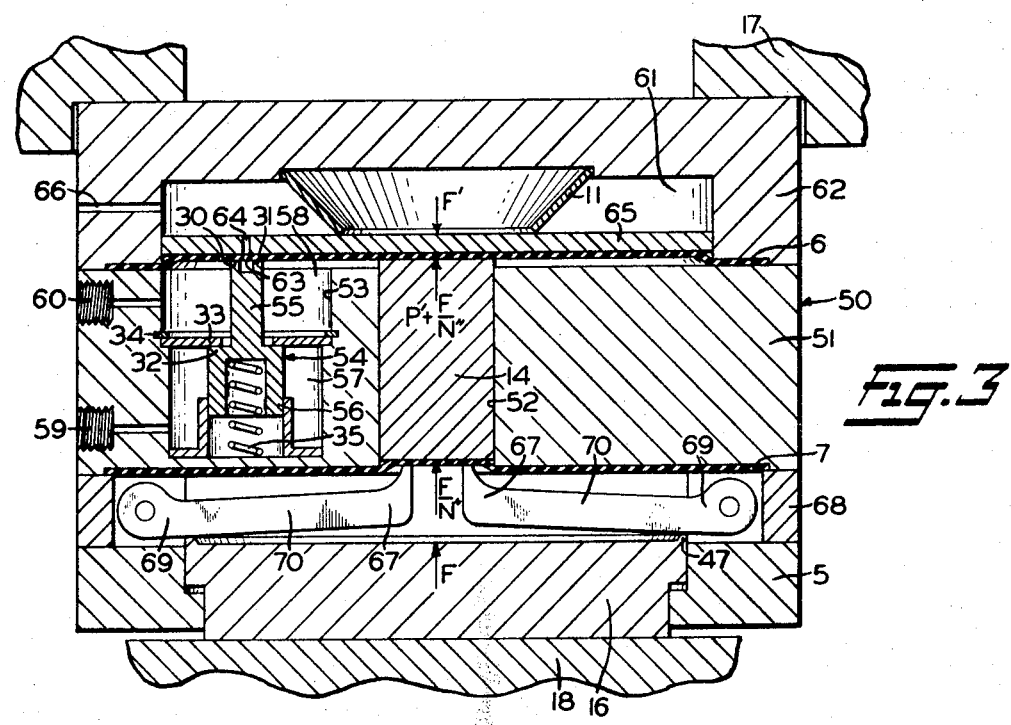
FIGS. 3 and 4 are elevational views, in section, of modified versions of the load weighing device shown in FIG. 2.

FIG. 3 shows a vehicle load weighing device 50 incorporating still further structural modifications. The Bellville spring 11, for example, is placed in the device 50 in inverted fashion as compared to its installation in the weighing device 1, and since there is no adjusting plug shown for adjusting the compressive action of the spring, said spring must be selected so as to provide the desired compressive stress F' when in its installed position in the weighing device.

A central housing section 51 has a coaxial bore 52 for sealingly and slidingly accommodating the action piston 14. An off center stepped bore 53, axially parallel to bore 52, accommodates a self-lapping valve unit 54 comprising an exhaust portion 55 and a supply portion 56, said supply and exhaust portions being arranged similarly to the supply and exhaust valve portions 28 and 29 of the weighing devices 1 and 38 shown in FIGS. 2 and 4, respectively. Valve unit 54 cooperates with bore 53 to form a supply chamber 57 and a delivery chamber 58 with passageways 59 and 60 connecting thereto from a source of fluid under pressure (not shown) and to brake-applying apparatus (not shown) respectively.

A chamber 61 formed in an upper housing section 62, in which Bellville spring 11 is disposed, also acts as the exhaust chamber. The exhaust of delivery chamber 58, and therefore the brake-applying apparatus, is accomplished via a perforation 63 in a diaphragm 64 clamped between housing sections 51 and 62 and via a transverse passageway 64 formed in a reaction piston 65 operatively disposed in chamber 61 between Bellville spring 11 and the upper side of said diaphragm. Chamber 61 is open to atmosphere via a passageway 66.

The weighing device 50 also differs from the weighing devices 1 and 38 in that the function of the distributor members 15 and 42 of the weighing devices 1 and 38, respectively, in reducing the force F acting on transfer member 16 to a lesser force acting on the lower end of action piston 14 is accomplished by a plurality of levers 67 equiangularly spaced in a common plane perpendicular to the axis of the weighing device and each having one end pivotally anchored in an annular housing section 68 clamped between the outer peripheral extremities of central section 51 and retaining ring section 5. The levers 67 extend radially inwardly toward the axis of the weighing device so as to have the free ends thereof in contact with the lower end of action piston 14. The lip 47 on the transfer member 16 acts, as in the case of levers 44 in the device 38, to divide levers 67 into shorter portions 69 and longer portions 70. The levers 67 function similarly to the levers 44 in device 38, and, therefore, the portion of load force F transferred to the lower end of action piston 14 may be expressed as $F/n''$, represented by the arrow $F/n''$, wherein $n''$ is the ratio of longer portion 70 to shorter portion 69.

Again, other than the structural differences above noted, the weighing device 50 shown in FIG. 3 operates in similar fashion as the weighing devices 1 and 38, as above described.

In characteristic operation of the weighing devices 1, 38, and 50 discussed above, the degree of fluid pressure control signals supplied by the valve units 20 and 54 to the brake-applying apparatus (not shown) are inversely proportional to the degree of vehicle load.

If it is desired to have a vehicle load weighing device which operates to provide a fluid pressure control signal directly proportional in magnitude to the degree of vehicle load, anyone of the weighing devices 1, 38, and 50 may be readily modified to produce such results by mounting the self-lapping unit 20 in a chamber 71 (see FIG. 2), for example, formed by bore 10 in upper housing section 2 of the weighing device 1, said self-lapping unit being oriented in an inverted position relative to that in which it is shown in FIG. 2 with exhaust valve 31 cooperating with a valve seat (not shown) disposed on the upper side of reaction piston 9 and with said chamber 71 and passageway 37 providing the exhaust means.

The results attainable, when the self-lapping valve unit 20 is mounted in the manner immediately above described, are also indicated graphically in FIG. 1. For example, if the compression of spring 11 is adjusted to a relatively high compressive force F', the vehicle load must reach a certain higher degree than an empty vehicle load, for example, to overcome the higher compressive force F'. Thus a fluid pressure control signal is not initiated until the load has attained a value designated as $F_0$ on the graph. Thereafter an increase in load produces a proportionately increased control signal. This function is represented by the lines $F_0$–$F_3$ and $F_0$–$F_4$. If the compressive adjustment of spring 11 is relatively low such that an empty vehicle load force F is sufficient for overcoming the relatively low compressive force F' of said spring, a fluid pressure control signal, designated as $P'_0$ on the graph in FIG. 1, is initiated and in effect before the vehicle is loaded. With loading of the vehicle, a control signal of proportionate degree is effected as represented by the lines $P'_0$–$F_5$ and $P'_0$–$F_6$.

Having now described the invention, what I claim as new and desire to secure by Letters Patent, is:

1. A vehicle load weighing device mountable between and subjectable to compressive and tractive forces of a fixed portion and a sprung portion of the vehicle for producing a fluid pressure control signal in accordance with the vehicle load, said weighing device comprising:
  a. a multi-section housing;
  b. valve means disposed in said housing and operable responsively to a net operating force for effecting delivery of a fluid pressure control signal at a degree corresponding to the degree of said net operating force;
  c. piston means operatively engaging said valve means for applying said net operating force thereto, said net operating force being the resultant of a selectively adjustable biasing force acting on a first side of said piston means, a vehicle load force acting on the opposite side of said piston means, and a fluid pressure force of said control signal pressure acting on one of said first and said opposite sides of the piston means;
  d. compressively adjustable spring means for providing said biasing force; and
  e. stress distributor means interposed between said opposite side of said piston means and the fixed portion of the vehicle for transmitting to said piston means a fraction of vehicle load stress acting on the side of said distributor means adjacent the fixed portion of the vehicle.

2. A vehicle load weighing device, as set forth in claim 1, wherein said valve means is of the self-lapping type.

3. A vehicle load weighing device, as set forth in claim 1, wherein said control signal pressure is directed to act on said opposite side of said piston means in opposition to said biasing force.

4. A vehicle load weighing device, as set forth in claim 1, wherein said stress distributor means comprises a hydrostatic element having a larger area adjacent the fixed portion of the vehicle and a smaller area adjacent said piston means, said fraction of vehicle load stress transmitted to said piston means being equivalent to the ratio of said smaller area to said larger area.

5. A vehicle load weighing device, as set forth in claim 1, wherein said stress distributor means comprises:
   a. a plurality of levers equiangularly spaced in a common plane perpendicular to the axis of the piston means each with one end pivotally anchored in the outer peripheral wall of said housing and the opposite end in contact with said opposite side of said piston means; and
   b. a circular transfer member interposed between the fixed portion of the vehicle and said plurality of levers, said transfer member having an annular lip encircling the outer periphery thereof and in contact with each of said levers at a fulcrum point for transferring vehicle load stress to said piston means through said transfer member and said levers at a ratio according to the relative lengths of the lever arms from the piston means to the fulcrum point and from the fulcrum point to the pivotally anchored end thereof.

6. A vehicle load weighing device, as set forth in claim 5, wherein the length of each of said levers from said piston means to the fulcrum point is greater than the length from the fulcrum point to the pivotally anchored end so as to effectively reduce the degree of vehicle load stress transferred from the transfer member to the piston means.

7. A vehicle load weighing device, as set forth in claim 6, wherein said levers are integrally and flexibly connected at their respective said one ends to an outer annular portion of a circular lever plate clamped between two adjacent annular housing sections corresponding in diameter to said lever plate.

8. A vehicle load weighing device, as set forth in claim 7, wherein said plurality of levers is formed by a plurality of equiangularly spaced radial slits extending from said outer annular portion toward a concentric circular opening formed in said lever plate.

* * * * *